(12) United States Patent
Tankielun et al.

(10) Patent No.: US 10,680,327 B2
(45) Date of Patent: Jun. 9, 2020

(54) CALIBRATION SYSTEM AND METHOD FOR CALIBRATING AN ANTENNA ARRAY

(71) Applicant: Rohde & Schwarz GmbH & Co. KG, Munich (DE)

(72) Inventors: Adam Tankielun, Ottobrunn (DE); Corbett Rowell, Munich (DE); Hendrik Bartko, Unterhaching (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 315 days.

(21) Appl. No.: 15/581,808

(22) Filed: Apr. 28, 2017

(65) Prior Publication Data

US 2018/0316091 A1 Nov. 1, 2018

(51) Int. Cl.
*H01Q 3/26* (2006.01)
*H04B 17/12* (2015.01)
*H04B 17/10* (2015.01)
*H01Q 3/34* (2006.01)
*H01Q 3/28* (2006.01)

(52) U.S. Cl.
CPC .......... *H01Q 3/267* (2013.01); *H04B 17/102* (2015.01); *H04B 17/12* (2015.01); *H01Q 3/28* (2013.01); *H01Q 3/34* (2013.01)

(58) Field of Classification Search
CPC ...... H01Q 3/267; H01Q 21/22; H04B 17/102; H04B 17/12; H04B 17/14; H04B 7/0426
See application file for complete search history.

(56) References Cited

U.S. PATENT DOCUMENTS

| | | | | |
|---|---|---|---|---|
| 5,572,219 | A | * 11/1996 | Silverstein | H01Q 3/005 342/165 |
| 6,037,898 | A | 3/2000 | Parish et al. | |
| 9,948,407 | B2 | * 4/2018 | Tang | H04B 17/12 |
| 2017/0187109 | A1 | * 6/2017 | Wang | H01Q 3/267 |
| 2017/0301988 | A1 | * 10/2017 | Schuman | G01S 7/4026 |
| 2018/0288723 | A1 | * 10/2018 | Cai | H04W 56/001 |

OTHER PUBLICATIONS

Kuehnke, "Phased Array Calibration Procedures Based on Measured Element Patterns", article in 11th International Conference on Antennas and Propagation, Conference Publication No. 480, IEEE 2001, retrieved on Apr. 19, 2017 from https://www.nearfield.com/aboutus/documents/EUCAP2016_KH_Phased_Array_Antenna_Calibration_Measurement.pdf, pp. 17-20, 4 Pages.

Hassett, "Phase Array Antenna Calibration Measurement Techniques and Methods", article in NSI-MI Technologies, Torrance, California, published at the 10th European Conference on Antennas and Propagation, Davos, Switzerland, on Apr. 10-15, 2016, retrieved on Apr. 19, 2017 from https://www.nearfield.com/aboutus/documents/EUCAP2016_KH_Phased_Array_Antenna_Calibration_Measurement.pdf, 4 Pages.

* cited by examiner

*Primary Examiner* — Dameon E Levi
*Assistant Examiner* — David E Lotter
(74) *Attorney, Agent, or Firm* — Ditthavong & Steiner, P.C.

(57) ABSTRACT

A calibration system for calibrating an antenna array comprising antenna elements comprises a measuring unit, and a calibration antenna connected to the measuring unit. The measuring unit sequentially excites each antenna element of the antenna array with an input signal and receives the corresponding output signal through the calibration antenna. Furthermore, the measuring unit measures a transfer function of each antenna element of the antenna array.

16 Claims, 2 Drawing Sheets

CALIBRATION SYSTEM AND METHOD FOR CALIBRATING AN ANTENNA ARRAY

TECHNICAL FIELD

The invention relates to a calibration system and a calibration method for calibrating an antenna array.

BACKGROUND ART

Generally, in times of an increasing number of wireless communication applications employing antenna array technology such as MIMO (Multiple Input Multiple Output) systems, there is a growing need of a calibration system and a calibration method for calibrating an antenna array.

U.S. Pat. No. 6,037,898 relates to a method operating in a communications station for calibrating the communications station. In this context, the communications station includes an antenna array of antenna elements, each having associated with it and included in a transmit apparatus chain and a receiver apparatus chain. Disadvantageously, said calibration method is exclusively applicable for a kind of self-test or self-calibration, respectively.

Accordingly, there is a need to provide a calibration system and a calibration method for calibrating any desired antenna array in a most efficient manner.

SUMMARY OF THE INVENTION

According to a first aspect of the invention, a calibration system for calibrating an antenna array is provided. The calibration system comprises a measuring unit, a calibration antenna connected to the measuring unit, and an analyzation unit connected to the measuring unit. The measuring unit sequentially excites each antenna element of the antenna array with an input signal and receives the corresponding output signal through the calibration antenna. Furthermore, the measuring unit measures a transfer function of each antenna element of the antenna array. Advantageously, due to the usage of the calibration antenna as a kind of external device, the calibration system can be used for any antenna array.

According to a first preferred implementation form of the first aspect, the analyzation unit calculates calibration values with respect to each antenna element of the antenna array on the basis of constant setup position values being constant over time for all antenna elements.

Advantageously, since the calibration antenna does not need to be moved, the antenna array can be calibrated in a most efficient manner.

According to a further preferred implementation form of the first aspect, the analyzation unit calculates calibration values with respect to each antenna element of the antenna array on the basis of a predefined time-constant radiation pattern of each antenna element or the calibration antenna.

According to a further preferred implementation form of the first aspect, the analyzation unit calculates single component values of the transfer function. Advantageously, this allows for an exact calibration.

According to a further preferred implementation form of the first aspect, the calibration system comprises a power distribution network, wherein each antenna element of the antenna array is electively enabled or disabled with the aid of the power distribution network. Advantageously, the behaviour of each antenna element can be determined without interfering influences of the remaining antenna element of the antenna array.

According to a further preferred implementation form of the first aspect, at least one of the antenna elements of the antenna array or the calibration antenna provides a linearly polarized radiation.

According to a further preferred implementation form of the first aspect, the calibration antenna is in a far-field region of at least one of the antenna elements of the antenna array. Additionally or alternatively, at least one of the antenna elements of the antenna array is in a far-field region of the calibration antenna.

According to a further preferred implementation form of the first aspect, partial directivity patterns for at least one of the antenna elements of the antenna array or the calibration antenna are defined at a predefined reference point.

According to a further preferred implementation form of the first aspect, far-field phase patterns for at least one of the antenna elements of the antenna array or the calibration antenna are defined at a predefined reference point.

According to a second aspect of the invention, a calibration method for calibrating an antenna array is provided. The calibration method comprises the steps of sequentially exciting each antenna element of the antenna array with an input signal provided by a measuring unit and receiving the corresponding output signal through a calibration antenna connected to the measuring unit, and measuring a transfer function of each antenna element of the antenna array with the aid of the measuring unit. Advantageously, due to the usage of the calibration antenna as a kind of external device, the calibration system can be used for any antenna array.

According to a first preferred implementation form of the second aspect, the calibration method further comprises the step of calculating calibration values with respect to each antenna element of the antenna array with the aid of an analyzation unit connected to the measuring unit on the basis of constant setup position values being constant over time for all antenna elements. Advantageously, since the calibration antenna does not need to be moved, the antenna array can be calibrated in a most efficient manner.

According to a further preferred implementation form of the second aspect, the calibration method further comprises the step of calculating calibration values with respect to each antenna element of the antenna array with the aid of the analyzation unit on the basis of a predefined time-constant radiation pattern of each antenna element or the calibration antenna.

According to a further preferred implementation form of the second aspect, the calibration method further comprises the step of calculating single component values of the transfer function with the aid of the analyzation unit. Advantageously, this allows for an exact calibration.

According to a further preferred implementation form of the second aspect, the calibration method further comprises the step of electively enabling or disabling each antenna element of the antenna array with the aid of a power distribution network. Advantageously, the behaviour of each antenna element can be determined without interfering influences of the remaining antenna element of the antenna array.

According to a further preferred implementation form of the second aspect, at least one of the antenna elements of the antenna array or the calibration antenna provides a linearly polarized radiation.

According to a further preferred implementation form of the second aspect, the calibration antenna is in a far-field region of at least one of the antenna elements of the antenna array. Additionally or alternatively, at least one of the antenna elements of the antenna array is in a far-field region of the calibration antenna.

According to a further preferred implementation form of the second aspect, the calibration method further comprises the step of defining partial directivity patterns for at least one of the antenna elements of the antenna array or the calibration antenna at a predefined reference point.

According to a further preferred implementation form of the second aspect, the calibration method further comprises the step of defining far-field phase patterns for at least one of the antenna elements of the antenna array or the calibration antenna at a predefined reference point.

BRIEF DESCRIPTION OF THE DRAWING

Exemplary embodiments of the invention are now further explained with respect to the drawings by way of example only, and not for limitation. In the drawings.

DETAILED DESCRIPTION OF THE PREFERRED EMBODIMENTS

Figure 1:
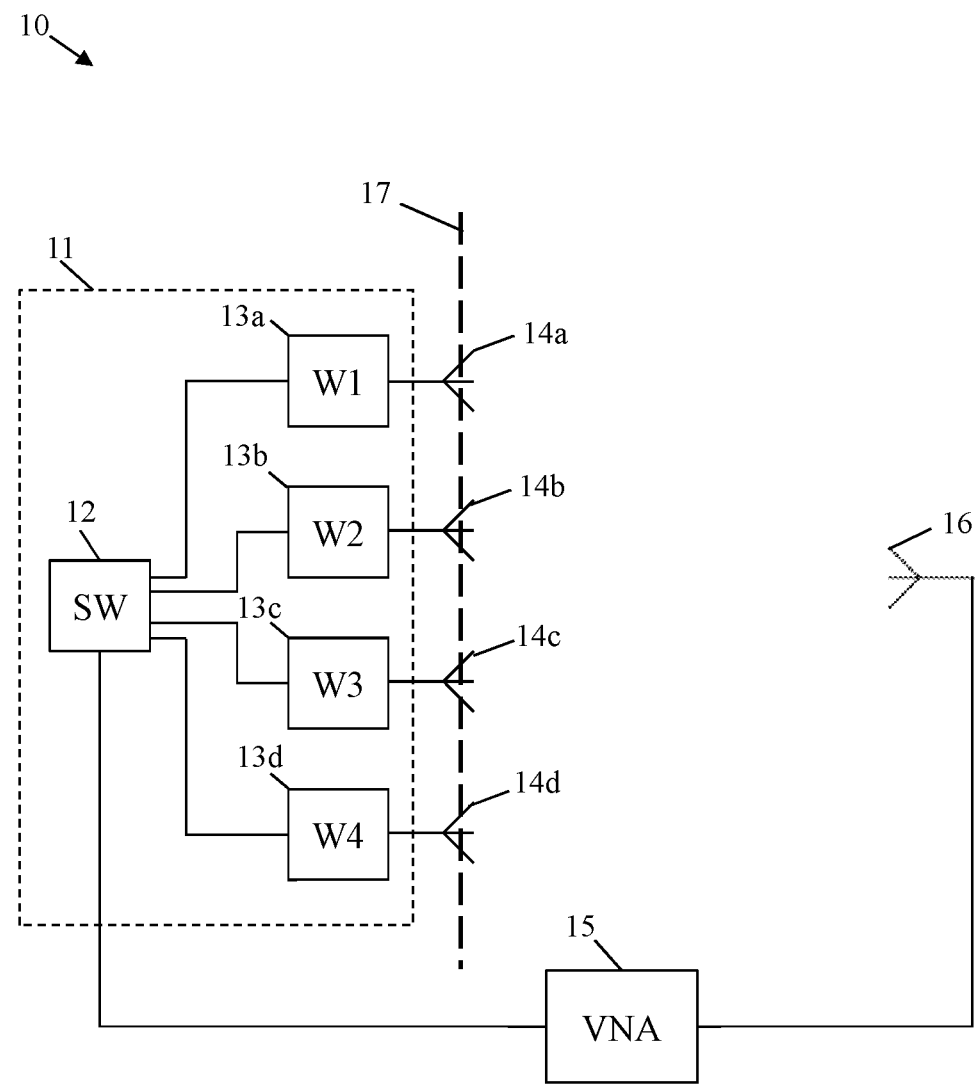
FIG. 1 shows a block diagram of an exemplary embodiment of the first aspect of the invention.

FIG. 1 illustrates an exemplary embodiment of a calibration system 10. The invention is not limited to this embodiment and all features below are explained for the purpose of example only.

The calibration system 10 comprises a measuring unit 15 comprising an analyzation unit, exemplarily a vector network analyzer 15, and a calibration antenna 16 connected to the vector network analyzer 15. In addition to this, the vector network analyzer 15 is connected to a power distribution network 11.

Said power distribution network 11 comprises a switching unit 12, wherein an input of the switching unit 12 is connected to an output of the measuring unit 15 or the vector network analyzer 15, respectively. Furthermore, the switching unit 12 of the power distribution network 11 comprises at least as many outputs as the number of antenna elements for outputting its input signal to the respective antenna element.

In this exemplary case, due to the fact that the antenna array to be calibrated comprises four antenna elements 14a, 14b, 14c, 14d, the switching unit 12 comprises four outputs.

In addition to this, each of the outputs of the switching unit 12 is not directly connected to the respective antenna element 14a, 14b, 14c, 14d but through a corresponding component determination unit 13a, 13b, 13c, 13d in order to illustrate that especially single component values of the transfer function of each antenna element 14a, 14b, 14c, 14d of the antenna array are determined. Alternatively, each output of the switching unit 12 may be directly connected to the respective antenna element 14a, 14b, 14c, 14d of the antenna array.

Furthermore, it should be mentioned that for calibrating the antenna array of antenna elements 14a, 14b, 14c, 14d with respect to a calibration plane 17, the vector network analyzer 15 sequentially excites each antenna element 14a, 14b, 14c, 14d with an input signal passed to the respective antenna element 14a, 14b, 14c, 14d with the aid of the switching unit 12 and receives the corresponding output signal through the preferably motionless calibration antenna 16. Then, the vector network analyzer 15 measures the transfer function of each antenna element 14a, 14b, 14c, 14d of the antenna array. All these individual transfer functions might then be summed up to a resulting combined transfer function.

Moreover, the vector network analyzer 15, alternatively an external analyzation unit, calculates calibration values with respect to each antenna element 14a, 14b, 14c, 14d of the antenna array on the basis of constant setup position values being constant over time for all antenna elements 14a, 14b, 14c, 14d. In other words, at least one of the antenna arrays or the calibration antenna 16 is not moved.

The position might take into account the opening angle of the antenna elements 14a-14d. The same direction of the calibration antenna 16 might be used for the calibrating of all antenna elements or different or individual directions might be used to calibrating each of the antenna elements 14a-14d.

Additionally or alternatively to the above-mentioned calculation of single component values of the transfer function, the vector network analyzer 15, alternatively the above-mentioned external analyzation unit, calculates calibration values with respect to each antenna element 14a, 14b, 14c, 14d of the antenna array on the basis of a predefined time-constant radiation pattern of each antenna element 14a, 14b, 14c, 14d or the calibration antenna 16.

In the context of calibrating the antenna array, each antenna element 14a, 14b, 14c, 14d of the antenna array may be electively enabled or disabled with the aid of the power distribution network 11, especially with the aid of the switching unit 12 of the power distribution network 11.

Furthermore, at least one of the antenna elements 14a, 14b, 14c, 14d of the antenna array or the calibration antenna 16 provides a linearly polarized radiation or a cross polarization. The calibration might also be done several times for several planes of polarization.

Moreover, the calibration antenna 16 is in a far-field region of at least one of the antenna elements 14a, 14b, 14c, 14d of the antenna array.

Additionally or alternatively, at least one of the antenna elements 14a, 14b, 14c, 14d of the antenna array is in a far-field region of the calibration antenna 16.

In addition to this, partial directivity patterns for at least one of the antenna elements 14a, 14b, 14c, 14d of the antenna array or the calibration antenna 16 are defined at a predefined reference point with respect to the calibration plane 17.

Additionally or alternatively, far-field phase patterns for at least one of the antenna elements 14a, 14b, 14c, 14d or the calibration antenna are defined at a predefined reference point with respect to the calibration plane 17.

Figure 2:
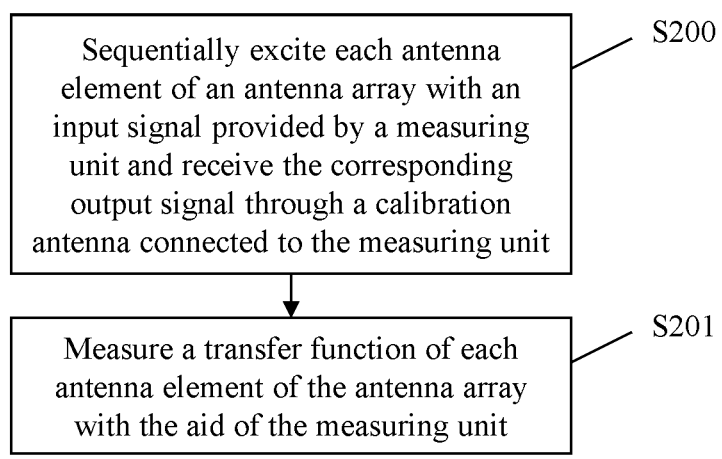
FIG. 2 shows a flow chart of an exemplary embodiment of the second aspect of the invention.

Finally, FIG. 2 shows a flow chart of an exemplary embodiment of the inventive method. In a first step S200, each antenna element of an antenna array is sequentially excited with an input signal provided by a measuring unit and the corresponding output signal is received through a calibration antenna connected to the measuring unit. Then, in a second step S201, a transfer function of each antenna element of the antenna array is measured with the aid of the measuring unit.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. A calibration system for calibrating an antenna array, the calibration system comprising:
a measuring unit,
a calibration antenna connected to the measuring unit, and
an analyzation unit connected to the measuring unit,
wherein the measuring unit sequentially excites each antenna element of the antenna array with an input signal and receives the corresponding output signal through the calibration antenna,
wherein the measuring unit measures a transfer function of each antenna element of the antenna array,
wherein the calibration system comprises a power distribution network, wherein each antenna element of the antenna array is electively enabled or disabled with the aid of the power distribution network, and
wherein the power distribution network comprises a switching unit, wherein each of the outputs of the switching unit is connected to the respective antenna element through a corresponding component determination unit.

2. The calibration system according to claim 1,
wherein the analyzation unit calculates calibration values with respect to each antenna element of the antenna array on the basis of constant setup position values being constant over time for all antenna elements.

3. The calibration system according to claim 1,
wherein the analyzation unit calculates calibration values with respect to each antenna element of the antenna array on the basis of a predefined time-constant radiation pattern of each antenna element or the calibration antenna.

4. The calibration system according to claim 1,
wherein the analyzation unit calculates single component values of the transfer function.

5. The calibration system according to claim 1,
wherein at least one of the antenna elements of the antenna array or the calibration antenna provides a linearly polarized radiation.

6. The calibration system according to claim 1,
wherein the calibration antenna is in a far-field region of at least one of the antenna elements of the antenna array, or
wherein at least one of the antenna elements of the antenna array is in a far-field region of the calibration antenna.

7. The calibration system according to claim 1,
wherein partial directivity patterns for at least one of the antenna elements of the antenna array or the calibration antenna are defined at a predefined reference point.

8. The calibration system according to claim 1,
wherein far-field phase patterns for at least one of the antenna elements of the antenna array or the calibration antenna are defined at a predefined reference point.

9. A calibration method for calibrating an antenna array, the calibration method comprising the steps of:
sequentially exciting each antenna element of the antenna array with an input signal provided by a measuring unit and receiving the corresponding output signal through a calibration antenna connected to the measuring unit,
measuring a transfer function of each antenna element of the antenna array with the aid of the measuring unit,
electively enabling or disabling each antenna element of the antenna array with the aid of a power distribution network, and
wherein the power distribution network comprises a switching unit, wherein each of the outputs of the switching unit is connected to the respective antenna element through a corresponding component determination unit.

10. The calibration method according to claim 9,
wherein the calibration method further comprises the step of calculating calibration values with respect to each antenna element of the antenna array with the aid of an analyzation unit connected to the measuring unit on the basis of constant setup position values being constant over time for all antenna elements.

11. The calibration method according to claim 9,
wherein the calibration method further comprises the step of calculating calibration values with respect to each antenna element of the antenna array with the aid of the analyzation unit on the basis of a predefined time-constant radiation pattern of each antenna element or the calibration antenna.

12. The calibration method according to claim 9,
wherein the calibration method further comprises the step of calculating single component values of the transfer function with the aid of the analyzation unit.

13. The calibration method according to claim 9,
wherein at least one of the antenna elements of the antenna array or the calibration antenna provides a linearly polarized radiation.

14. The calibration method according to claim 9,
wherein the calibration antenna is in a far-field region of at least one of the antenna elements of the antenna array, or
wherein at least one of the antenna elements of the antenna array is in a far-field region of the calibration antenna.

15. The calibration method according to claim 9,
wherein the calibration method further comprises the step of defining partial directivity patterns for at least one of the antenna elements of the antenna array or the calibration antenna at a predefined reference point.

16. The calibration method according to claim 9,
wherein the calibration method further comprises the step of defining far-field phase patterns for at least one of the antenna elements of the antenna array or the calibration antenna at a predefined reference point.

* * * * *